(12) United States Patent
Labauze et al.

(10) Patent No.: US 7,084,228 B2
(45) Date of Patent: Aug. 1, 2006

(54) RUBBER COMPOSITION FOR A TIRE TREAD

(75) Inventors: Gérard Labauze, Clermont-Ferrand (FR); Samuel Mathieu, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/045,231

(22) Filed: Jan. 31, 2005

(65) Prior Publication Data

US 2005/0209413 A1    Sep. 22, 2005

Related U.S. Application Data

(63) Continuation of application No. PCT/EP03/007971, filed on Jul. 22, 2003.

(30) Foreign Application Priority Data

Jul. 29, 2002    (FR) ..................................... 02 9630

(51) Int. Cl.
*C08F 136/06*    (2006.01)
(52) U.S. Cl. ................... 526/335; 526/336; 526/340.3; 152/209.1; 152/905
(58) Field of Classification Search ................ 526/335, 526/336, 340.3; 152/209.1, 905
See application file for complete search history.

(56) References Cited

U.S. PATENT DOCUMENTS 6,121,392 A    9/2000    Thompson
6,245,873 B1 *    6/2001    Wideman et al. ........... 526/283

FOREIGN PATENT DOCUMENTS

| EP | 0 899 297 B1 | 10/2001 |
| EP | 1 050 547 B1 | 10/2004 |
| JP | 10-204216 A | 4/1998 |

* cited by examiner

*Primary Examiner*—Robert D. Harlan
(74) *Attorney, Agent, or Firm*—Buchanan Ingersoll PC

(57) ABSTRACT

A cross-linkable or cross-linked rubber composition usable to constitute a tire tread having improved wear resistance, to such a tread and to a tire incorporating this tread. The composition is particularly applicable to tires of passenger-vehicle type. The rubber composition includes a plasticizing resin of number-average molecular weight of from 400 to 2000 g/mol, the resin having units resulting from the polymerization of a monocyclic or bicyclic unsaturated terpene, in a mass fraction of from 70% to 100%, and having a glass transition temperature greater than 50° C. and less than 120° C.

18 Claims, No Drawings

RUBBER COMPOSITION FOR A TIRE TREAD

CROSS REFERENCE TO RELATED APPLICATIONS

This application is a continuation of International Patent Application No. PCT/EP2003/007971, filed Jul. 22, 2003, published in French on Feb. 12, 2004, as WO 2004/013221, which claims priority of French Patent Application No. 02/09630, filed Jul. 29, 2002, the disclosures of both applications being incorporated herein in their entirety.

BACKGROUND OF THE INVENTION

Field of the Invention

The present invention relates to a cross-linkable or cross-linked rubber composition which is usable to constitute a tire tread having improved wear resistance, to such a tread and to a tire incorporating this tread. The invention applies in particular to tires of passenger-vehicle type.

Since fuel economies and the need to preserve the environment have become priorities, it has become desirable to produce mixes having good mechanical properties and as low a hysteresis as possible so that they can be processed in the form of rubber compositions usable for the manufacture of various semi-finished products involved in the constitution of tires, such as treads, and in order to obtain tires having reduced rolling resistance.

Among the numerous solutions proposed for reducing the hysteresis of tread compositions and, consequently, the rolling resistance of tires comprising such compositions, mention may, for example, be made of the compositions described in U.S. Pat. Nos. 4,550,142 and 5,001,196; or EP-A-299 074 or 447 066.

An attempt has also been made to improve the grip of the tires using tread rubber compositions incorporating specific plasticizers.

EP-A-1 028 130 thus describes a rubber composition for a tire tread which is intended to improve the grip of the tire incorporating it. This rubber composition comprises a polymeric resin obtained by copolymerization of dicyclopentadiene and limonene. The units resulting from the polymerization of limonene may be present equally well in a minority or majority quantity in this resin, as shown by the examples of embodiment of this document in which the resins have been obtained with mass fractions of 32% limonene to 68% dicyclopentadiene (examples 1 to 9) or alternatively 67% limonene to 3% dicyclopentadiene (example 10).

EP-A-1 063 246; 1 029 873; 990 669 and 1 077 223 also describe rubber compositions for tire treads which are intended to improve the grip of the tires incorporating them. These rubber compositions each comprises a polymeric resin obtained by copolymerization of four monomers consisting of dicyclopentadiene or of dimethyl-dicyclopentadiene, limonene, a polycyclic aromatic hydrocarbon (indene) and a monocyclic aromatic hydrocarbon (alkyl styrene or vinyl toluene). In all the examples of embodiment of each of these documents, the respective mass fractions of the aforementioned four monomers are either 25%, 25%, 25%, 25% or 12.5%, 37.5%, 25%, 25%.

In addition to this reduction in the rolling resistance and this improvement in grip, it is equally desirable to improve the wear resistance of the tire treads and, consequently, to increase the life of the latter (this improved wear resistance also having the effect of reducing over time the debris of tires on the ground due to traveling and the quantity of worn tires which are sent for recycling, which helps to preserve the environment).

Relatively few solutions have been proposed to date to improve this wear resistance. Mention may be made, for example, of the compositions described in JP-A-61 238 501, EP-A-502 728 or EP-A-501 227.

Now, it is well known to the person skilled in the art that an improvement in one performance characteristic for tires is frequently obtained to the detriment of the other performance characteristics. By way of example, mention may be made of the use in tread compositions of amorphous or semi-crystalline polymers having a high glass transition temperature (Tg) or melting temperature and a reduced molecular weight, the effect of such use being to improve the grip on dry or damp ground of the corresponding tires but also to adversely affect their wear resistance.

SUMMARY OF THE INVENTION

The object of the present invention is to propose a cross-linkable or cross-linked rubber composition which is usable to constitute a tire tread having improved wear resistance, and it is achieved in that the Applicants have recently surprisingly discovered that a plasticizing resin of number-average molecular weight of from 400 to 2000 g/mol and of a glass transition temperature greater than 50° C. and less than 120° C. which comprises, in a mass fraction of from 70% to 100%, units resulting from the polymerization of a monocyclic or bicyclic unsaturated terpene, imparts to a tire, the tread of which is formed of a rubber composition incorporating this resin, improved wear resistance compared with that of known tires the tread of which comprises a plasticizing oil as plasticizer, while imparting to this tire according to the invention a rolling resistance and a grip on dry and damp ground which are close to those of these same known tires.

It will be noted that the plasticizing resin according to the invention makes it possible to impart improved endurance to the tire incorporating it in its tread, insofar as it improves the resistance of the tire to the separation of the triangulation crown plies which it comprises in its crown reinforcement.

Preferably, said resin has a number-average molecular weight of from 500 to 1000 g/mol and, even more preferably, of from 550 to 700 g/mol.

Equally preferably, said resin has a glass transition temperature of from 60° C. to 100° C. and, even more preferably, of from 65° C. to 90° C.

According to another preferred characteristic of the invention, said resin has a polymolecularity index less than 2.

According to another preferred characteristic of the invention, said resin comprises said units resulting from the polymerization of a monocyclic or bicyclic unsaturated terpene in a mass fraction of from 90% to 100%.

DETAILED DESCRIPTION OF THE INVENTION

According to a first mode of embodiment of the invention, said unsaturated terpene from which the resin has resulted is a monocyclic unsaturated terpene, preferably a limonene (i.e. 4-isopropenyl 1-methylcyclohexene) such as d-limonene (dextrorotatory enantiomer), or alternatively dipentene (racemate of the dextrorotatory and laevorotatory enantiomers of limonene). In accordance with this first mode, the resin according to the invention preferably has a glass transition temperature Tg of from 60 to 80° C. and, even more preferably, of from 65 to 75° C.

According to a first example of embodiment according to the invention of this first mode, said resin furthermore comprises one or more units resulting from at least one monomer, whether hydrocarbon or not, which is not a monocyclic unsaturated terpene and which may advantageously be a bicyclic unsaturated terpene such as an a-pinene (i.e. 2,6,6-trimethylbicyclo[3.1.1]hept-2-ene), a monocyclic or polycyclic aromatic hydrocarbon such as styrene or an alkyl styrene, a cyclic diene such as dicyclopentadiene, a conjugated diene such as isoprene, acrylonitrile or alternatively methyl methacrylate.

By way of examples of such resins according to this first example, mention may be made of those sold by DRT under the name "Dercolyte L120" and by ARIZONA under the names "Sylvares TR7125" and "Sylvagum TR7125C", which all comprise units resulting from the polymerization of d-limonene or of dipentene in a mass fraction of between 90% and 100%.

According to a second example of embodiment according to the invention of this first mode, said resin is constituted of said units resulting from the homopolymerization of said monocyclic unsaturated terpene. A resin resulting in its entirety from the homopolymerization of d-limonene or dipentene, preferably a resin of number-average molecular weight of from 550 g/mol to 650 g/mol and a glass transition temperature of from 60° C. to 80° C., is advantageously usable.

It will be noted that d-limonene is a natural extract (it is found in its natural state in the skin of oranges) and that, consequently, the plasticizing resin resulting from the homopolymerization of this d-limonene is of exclusively natural origin, which contributes to reducing the pollution of the environment upon rolling of tires having treads which incorporate this resin.

According to a second mode of embodiment of the invention, said unsaturated terpene from which the resin has resulted is a bicyclic unsaturated terpene, preferably a α-pinene. In accordance with this second mode, the resin according to the invention preferably has a glass transition temperature Tg of from 80 to 100° C.

According to a first example of embodiment according to the invention of this second mode, said resin furthermore comprises one or more units resulting from at least one monomer, whether hydrocarbon or not, which is not a bicyclic unsaturated terpene and which may advantageously be a monocyclic unsaturated terpene such as a limonene or dipentene, or a monocyclic or polycyclic aromatic hydrocarbon such as styrene or an alkyl styrene.

According to a second example of embodiment according to the invention of this second mode, said resin is constituted of said units resulting from the polymerization of said bicyclic unsaturated terpene.

According to one preferred characteristic of the invention, said rubber composition is based on one or more diene elastomers each resulting from at least one conjugated diene monomer having a molar ratio of units resulting from conjugated dienes which is greater than 50%, and this composition comprises said resin in a mass fraction of from 5 to 45 phr and, even more preferably, in a quantity of from 15 to 30 phr (phr: parts by weight per hundred parts of diene elastomer(s)).

According to one example of embodiment of the invention, said rubber composition comprises:

in a quantity greater than 40 phr and up to 100 phr, one or more diene elastomers each having a glass transition temperature of between –65° C. and –10° C., and in a quantity less than 60 phr and down to 0 phr, one or more diene elastomers each having a glass transition temperature of between –110° C. and –80° C.

Said diene elastomer(s) the glass transition temperature of which is of between –65° C. and –10° C. belong to the group consisting of copolymers of styrene and butadiene prepared in solution, copolymers of styrene and butadiene prepared in emulsion, natural polyisoprenes, synthetic polyisoprenes having a cis-1,4 linkage content greater than 95%, copolymers of butadiene and isoprene (BIR), copolymers of styrene and isoprene (SIR), terpolymers of styrene, butadiene and isoprene (SBIR) and of a mixture of these elastomers.

Said or each diene elastomer the glass transition temperature of which is of between –110° C. and –80° C. (preferably between –105° C. and –90° C.) comprises butadiene units in an amount equal to or greater than 70% and is preferably formed of a polybutadiene having a cis-1,4 linkage content greater than 90%.

According to a preferred embodiment of the invention, said rubber composition comprises, as diene elastomer(s) the glass transition temperature of which is of between –65° C. and –10° C., at least one copolymer of styrene and butadiene prepared in solution which has a glass transition temperature of between –50° C. and –15° C., or a copolymer of styrene and butadiene prepared in emulsion having a glass transition temperature of between –65° C. and –30° C.

According to one example of embodiment of the invention, said rubber composition comprises said diene elastomer(s) of a glass transition temperature of between –65° C. and –10° C. in a quantity of 100 phr, for example a blend of several copolymers of styrene and butadiene prepared in solution.

According to one variant embodiment of the invention, said rubber composition comprises a blend of said diene elastomer(s) of a glass transition temperature of between –65° C. and –10° C. with said diene elastomer(s) of a glass transition temperature of between –10° C. and –80° C.

According to a first mode of embodiment according to the invention of this variant, said composition comprises a blend of at least one of said polybutadienes having a cis-1,4 linkage content greater than 90% with at least one of said copolymers of styrene and butadiene prepared in solution.

According to a second mode of embodiment according to the invention of this variant, said composition comprises a blend of at least one of said polybutadienes having a cis-1,4 linkage content greater than 90% with at least one of said copolymers of styrene and butadiene prepared in emulsion.

According to a third embodiment according to the invention of this variant, said composition comprises a blend of at least one of said polybutadienes having a cis-1,4 linkage content greater than 90% with at least one of said natural or synthetic polyisoprenes.

As copolymer of styrene and butadiene prepared in emulsion, there may advantageously be used copolymers having a quantity of emulsifier varying substantially from 1 phr to 3.5 phr, for example E-SBR copolymers comprising 1.7 phr and 1.2 phr of emulsifier respectively, both of which are described in European patent application EP-A-1173 338 (see section I. of the examples of embodiment contained in the description of this application).

According to another characteristic of the invention, said rubber composition furthermore comprises at least one plasticizing oil extracted from petroleum of paraffinic, aromatic or naphthenic type, in a quantity of from 0 phr to 30 phr and, preferably, of from 0 phr to 15 phr.

Advantageously, said rubber composition may be totally devoid of said plasticizing oil extracted from petroleum.

It will be noted that the improvement in the wear resistance imparted by the resin according to the invention to the tire involves a reduction in the compaction time by compression to which the tread according to the invention is subjected during travel and, consequently, a reduction over time in the traveling loss of the plasticizing oil extracted from petroleum, such as the aromatic oil.

The result is an even more increased reduction in the pollution of the environment upon travel, which pollution is minimized still further by the reduced or zero quantity of oil which is initially present in the tread composition according to the invention.

According to one advantageous embodiment of the invention, said rubber composition furthermore comprises, in a quantity of from 10 phr to 40 phr, at least one plasticizing compound not extracted from petroleum of synthetic or natural type, which comprises at least one glycerol fatty acid triester, such that the whole constituted by said fatty acid(s) comprises oleic acid in a mass fraction equal to or greater than 60%.

This plasticizing compound based on said glycerol fatty acid triester makes it possible to minimize, in the tire tread incorporating it, on one hand, the exudation during travel by compression of the total plasticizer (including said resin and possibly said plasticizing oil extracted from petroleum) and, on the other hand, the migration of said plasticizer towards mixes adjacent to the tread, which results in compaction and hardening which are also minimized for the tread and, consequently, in retaining the grip performance over time.

The composition according to the invention also comprises a reinforcing filler, in a quantity which may vary from 50 to 150 phr.

According to another preferred characteristic of the invention, said reinforcing filler comprises a reinforcing inorganic filler in a mass fraction greater than 50%.

In the present application, "reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words being capable of replacing a conventional tire-grade carbon black filler in its reinforcement function.

Advantageously, the entirety or at the very least a majority proportion of said reinforcing inorganic filler is silica ($SiO_2$). The silica used may be any reinforcing silica known to the person skilled in the art, in particular any precipitated or fumed silica having a BET surface area and a CTAB specific surface area both of which are less than 450 $m^2$/g, even if the highly dispersible precipitated silicas are preferred.

Preferably, a silica having BET or CTAB specific surface areas which are both from 80 $m^2$/g to 260 $m^2$/g is used.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silicas Ultrasil 7000 and Ultrasil 7005 from Degussa, the silicas Zeosil 1165MP, 1135MP and 1115MP from Rhodia, the silica Hi-Sil EZ150G from PPG, the silicas Zeopol 8715, 8745 and 8755 from Huber, and treated precipitated silicas such as, for example, the aluminum-"doped" silicas described in the aforementioned application EP-A-0735088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

The reinforcing filler according to the invention advantageously comprises a blend of said reinforcing inorganic filler with carbon black, the mass fraction of carbon black in said reinforcing filler being preferably selected to be less than or equal to 30%.

For example, black/silica blends or blacks partially or entirely covered with silica are suitable to form the reinforcing filler. Also suitable are reinforcing inorganic fillers comprising carbon blacks modified by silica such as, and this is non-limitative, the fillers sold by CABOT under the name "CRX 2000", which are described in International Patent Specification WO-A-96/37547.

As reinforcing inorganic filler, there may also be used, in non-limitative manner,
  aluminas (of formula $Al_2O_3$), such as aluminas of high dispersibility which are described in European Patent Specification EP-A-810 258, or alternatively
  aluminum hydroxides, such as those described in International Patent Specification WO-A99/28376.

The rubber composition according to the invention furthermore comprises, in conventional manner, a reinforcing inorganic filler/elastomeric matrix bonding agent (also referred to as coupling agent), the function of which is to ensure sufficient chemical and/or physical bonding (or coupling) between said inorganic filler and the matrix, while facilitating the dispersion of this inorganic filler within said matrix.

"Coupling agent" is more precisely understood to mean an agent capable of establishing a sufficient chemical and/or physical connection between the filler in question and the elastomer, while facilitating the dispersion of this filler within the elastomeric matrix. Such a coupling agent, which is at least bifunctional, has, for example, the simplified general formula "Y-T-X", in which:
  Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);
  X represents a functional group ("X" function) which is capable of bonding physically and/or chemically with the elastomer, for example by means of a sulphur atom;
  T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions which can be used for the manufacture of tires, the effective bonding or coupling between a reinforcing inorganic filler such as silica and a diene elastomer, such as, for example, organosilanes, in particular polysulphurized alkoxysilanes or mercaptosilanes, or alternatively polyorganosiloxanes bearing the X and Y functions mentioned above, may be used.

Silical/elastomer coupling agents in particular have been described in a large number of documents, the best known being bifunctional alkoxysilanes such as polysulphurized alkoxysilanes.

In particular polysulphurized alkoxysilanes, which are referred to as "symmetrical" or "asymmetrical" depending on their specific structure, are used, such as those described for example in patents U.S. Pat. Nos. 3,842,111, 3,873,489, 3,978,103, 3,997,581, 4,002,594, 4,072,701, 4,129,585, or in the more recent patents U.S. Pat. Nos. 5,580,919, 5,583, 245, 5,650,457, 5,663,358, 5,663,395, 5,663,396, 5,674,932, 5,675,014, 5,684,171, 5,684,172, 5,696,197, 5,708,053, 5,892,085 and EP-A-1043 357, which set forth such known compounds in detail.

Particularly suitable for implementing the invention, without the definition below being limitative, are symmetrical polysulphurized alkoxysilanes which satisfy the following general formula (I):

$$Z\text{-}A\text{-}S_n\text{-}A\text{-}Z, \text{ in which:} \qquad (I)$$

n is an integer from 2 to 8 (preferably from 2 to 5);

A is a divalent hydrocarbon radical (preferably $C_1$–$C_{18}$ alkylene groups or $C_6$–$C_{12}$ arylene groups, more particularly $C_1$–$C_{10}$ alkylene, notably $C_1$–$C_4$ alkylene, in particular propylene);

Z corresponds to one of the formulae below:

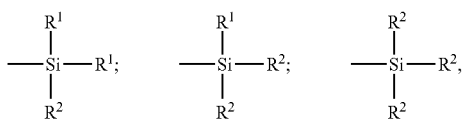

in which:

the radicals $R^1$, which may or may not be substituted, and may be identical or different, represent a $C_1$–$C_{18}$ alkyl group, a $C_5$–$C_{18}$ cycloalkyl group, or a $C_6$–$C_{18}$ aryl group, (preferably $C_1$–$C_6$ alkyl groups, cyclohexyl or phenyl, in particular $C_1$–$C_4$ alkyl groups, more particularly methyl and/or ethyl), the radicals $R^2$, which may or may not be substituted, and may be identical or different, represent a $C_1$–$C_{18}$ alkoxyl group or a $C_5$–$C_{18}$ cycloalkoxyl group (preferably $C_1$–$C_8$ alkoxyl groups or $C_5$–$C_8$ cycloalkoxy groups, more preferably $C_1$–$C_4$ alkoxyl groups, in particular methoxyl and/or ethoxyl).

In the case of a mixture of polysulphurized alkoxysilanes in accordance with Formula (I) above, in particular conventional, commercially available, mixtures, it will be understood that the average value of the "n"s is a fractional number, preferably within a range from 2 to 5.

As polysulphurized alkoxysilanes, mention will be made more particularly of the polysulphides (in particular disulphides, trisulphides or tetrasulphides) of bis-(($C_1$–$C_4$) alkoxyl-($C_1$–$C_4$)alkylsilyl($C_1$–$C_4$)alkyl), such as for example the polysulphides of bis(3-trimethoxysilylpropyl) or of bis(3-triethoxysilylpropyl). Of these compounds, in particular bis(3-triethoxysilylpropyl)tetrasulphide, abbreviated TESPT, of the formula $[(C_2H_5O)_3Si(CH_2)_3S_2]_2$, or bis(triethoxysilylpropyl)disulphide, abbreviated TESPD, of the formula $[(C_2H_5O)_3Si(CH_2)_3S]_2$, are used. TESPD is sold, for example, by Degussa under the names Si266 or Si75 (in the latter case, in the form of a mixture of disulphide (75% by weight) and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n close to 4). Mention will also be made of tetrasulphurized monoalkoxysilanes, such as monoethoxydimethylsilylpropyl tetrasulphide (abbreviated to MESPT), which are the subject of international patent application PCT/EPO2/03774 in the name of the applicants.

The compositions according to the invention also comprise, in addition to the diene elastomers, said plasticizing resin, possibly said plasticizing oil, said reinforcing inorganic filler and possibly said bonding agent, all or some of the other constituents and additives usually used in rubber compositions, such as pigments, antioxidants, antiozone waxes, a cross-linking system based on either sulphur and/or peroxide and/or bismaleimides, one or more covering agents for the reinforcing inorganic filler such as alkylalkoxysilanes, polyols, amines or amides.

It will be noted that the or at least one of the diene elastomers usable in the composition according to the invention may comprise one or more functional groups specifically active for coupling to said reinforcing filler.

For coupling to a reinforcing inorganic filler, all the functional, coupled or starred groups which are known to the person skilled in the art for coupling to silica are suitable. In non-limitative manner, the following are suitable:

silanol or polysiloxane groups having a silanol end, as described in French patent specification FR-A-2 740 778 in the name of the Applicant. More precisely, this document teaches using a functionalizing agent for a living polymer obtained anionically, in order to obtain a function which is active for coupling to silica. This functionalizing agent is formed of a cyclic polysiloxane, such as a polymethylcyclo -tri-, -tetra- or -decasiloxane, said agent preferably being hexamethylcyclotrisiloxane. The functionalized polymers thus obtained can be separated from the reaction medium leading to their formation by steam extraction of the solvent, without their macrostructure and, consequently, their physical properties, changing; and alkoxysilane groups.

Mention may be made on this point of the functionalization reaction described in international patent specification WO-A-88/05448 for coupling to silica, which consists of reacting on a living polymer obtained anionically an alkoxysilane compound having at least one non-hydrolysable alkoxy radical. This compound is selected from among the haloalkyl alkoxysilanes.

Mention may also be made of French patent specification FR-A-2 765 882, regarding the obtaining of alkoxysilane functions. This document discloses the use of a trialkoxysilane, such as 3-glycidoxypropyltrialkoxysilane, for functionalizing a living diene polymer, for coupling to carbon black having silica fixed to its surface as majority reinforcing filler.

For coupling to carbon black, mention may be made for example of functional groups comprising a C—Sn bond. Such groups may be obtained as is known per se by reaction with a functionalizing agent of organohalotin type which may correspond to the general formula $R_3SnCl$, or with a coupling agent of organodihalotin type which may correspond to the general formula $R_2SnCl_2$, or with a starring agent of the organotrihalotin type which may correspond to the general formula $RSnCl_3$, or of tetrahalotin type which may correspond to the formula $SnCl_4$ (where R is an alkyl, cycloalkyl or aryl radical).

For coupling to the carbon black, mention may also be made of amine functional groups, for example obtained using 4,4'-bis-(diethylaminobenzophenone), also referred to as DEAB. Patent specifications FR-A-2 526 030 and U.S. Pat. No. 4,848,511 may be mentioned by way of example.

The compositions according to the invention may be prepared using known thermomechanical working processes for the constituents in one or more stages. For example, they may be obtained by thermomechanical working in one stage in an internal mixer which lasts from 3 to 7 minutes, with a speed of rotation of the blades of 50 rpm, or in two stages in an internal mixer which last from 3 to 5 minutes and from 2 to 4 minutes respectively, followed by a finishing stage effected at about 80° C., during which the sulphur and the vulcanization accelerators in the case of a composition which is to be sulphur-cross-linked are incorporated.

A tire tread according to the invention is such that it is made of said rubber composition according to the invention.

A tire according to the invention comprises this tread.

It will be noted that the present invention applies to all types of tires, which may for example be intended to be fitted on motor vehicles or non-motor vehicles, such as touring or competition automobiles or two-wheeled vehicles—including bicycles and light-duty motor vehicles such as motorcycles—, industrial vehicles selected from among vans, "heavy vehicles"—i.e. buses, road transport machinery (lorries, tractors, trailers), off-road vehicles—, agricultural machinery or construction machinery, aircraft, or other transport or handling vehicles.

The aforementioned characteristics of the present invention, as well as others, will be better understood on reading the following description of several examples of embodiment of the invention, which are given by way of illustration and not of limitation.

Determination of the Molecular Weights of the Resins According to the Invention by Size Exclusion Chromatography (SEC)

Size exclusion chromatography or SEC makes it possible physically to separate macromolecules according to their size in the swollen state in columns filled with a porous stationary phase. The macromolecules are separated by their hydrodynamic volume, the bulkiest being eluted first. Although not an absolute method, SEC does enable an assessment to be made of the molecular weight distribution of the resins. On the basis of commercially available standards of polystyrene of low molecular weight (of between 104 and 90000 g/mol), the various number-average Mn and weight-average Mw molecular weights are determined and the polydispersity index Ip calculated. Each sample of resin is solublized in tetrahydrofuran, at a concentration of about 1 g/l.

The apparatus used is a chromatograph "WATERS model Alliance 2690". The elution solvent is tetrahydrofuran (mobile phase), the flow rate is 1 ml/min., the temperature of the system is 35° C. and the duration of analysis is 40 mm. A set of three columns in series, having the respective trade names "WATERS type STYRAGEL HR4E" (mixed-bed column), "WATERS type STYRAGEL HR1" (of a porosity of 100 Angstrom) and "WATERS STYRAGEL HR0.5" (of a porosity of 50 Angstrom) is used for the stationary phase.

The injected volume of the solution of each resin sample is 100 µl. The detector is a "WATERS model 2410" differential refractometer and the chromatographic data processing software is the "WATERS MILLENNIUM" (version 3-2) system.

Measurement of the Glass Transition Temperatures of the Elastomers and Plasticizers The glass transition temperatures Tg of the elastomers and plasticizers were measured by means of a differential calorimeter ("differential scanning calorimeter").

As far as the measurements of Tg for the rubber compositions incorporating these elastomers and these plasticizers are concerned, dynamic measurements were carried out at a frequency of 10 Hz and at two different values of stresses (0.2 MPa and 0.7 MPa), which "MDC" measurements were carried out in accordance with ISO Standard 4664 (the mode of deformation being shearing and the test pieces being cylindrical).

Measurement of the Properties of the Rubber Compositions

Mooney viscosity: ML(1+4) at 100° C. measured in accordance with Standard ASTM D 1646 of 1999.
Moduli of elongation ME100 (at 100%) measured in accordance with Standard ASTM D 412.
Scott break index: breaking load (MPa) and elongation (in %) measured at 23° C. in accordance with Standard ASTM D 412 of 1998.
Shore A hardness: measured in accordance with Standard ASTM D 2240 of 1997.
Hysteresis losses (HL): measured in % by rebound at 60° C. at the sixth impact, in accordance with the following equation: HL (%)=100×(Wo-$W_1$)/$W_1$, with $W_0$: energy supplied and $W_1$: energy restored.
Dynamic shear properties: measured in accordance with Standard ASTM D 2231-71, reapproved in 1977 (measurement as a function of the deformation carried out at 10 Hz with a peak-to-peak deformation of 0.15% to 50%, and measurement as a function of the temperature carried out at 10 Hz under a repetitive stress of 70 or 20 N/cm$^2$ with a temperature sweep of −80 to 100° C.).

Measurement of the Performance of the Tires

Relative performance indices, relative to a reference index 100 characterizing a "control" tire (a performance index greater than this base 100 indicating a performance superior to that of the corresponding "control" tire), were used.

The rolling resistance of each of the tires tested was measured by running on a test drum, at an ambient temperature of 25° C., under a load of 392 daN and at a speed of 80 km/h, the internal pressure of the tire being 2.1 bar, for tires of dimensions 175/70 R14 "MXT".

The wear resistance of each tire was determined by means of a relative wear index which is a function of the height of rubber remaining, after running on a winding road circuit, at an average speed of 77 km/h and until the wear reaches the wear indicators located in the grooves in the treads. This relative wear index was obtained by comparing the height of rubber remaining on a tread according to the invention with the height of rubber remaining on a "control" tread, which by definition has a wear index of 100.

The grip of each tire tested was evaluated by measuring braking distances in "ABS" braking mode, both on dry ground and on wet ground. More precisely, the braking distance in "ABS" mode was measured, on dry ground, going from a speed of 70 km/h to 20 km/h and, on wet ground (polished concrete surface with 2 mm of surface water), going from a speed of 40 km/h to 10 km/h.

The behavior on wet ground of each tire was evaluated by the time taken to cover one lap of a wetted winding road circuit, an attributed value of 101 corresponding to a gain of 1 second over this lap of the circuit.

The resistance of the tires to the separation of the crown plies was also evaluated by means of relative performance indices, relative to a reference index 100 characterizing a "control" tire (a performance index greater than this base 100 indicating a superior performance to that of the corresponding "control" tire).

This resistance was measured by a running test on a test drum, the surface of which is provided with obstacles (bars and "polars" which stress the edges of the belt of the tire formed of two working crown plies WCP1 and WCP2), at an ambient temperature of 20° C., under a load of 490 daN and at a speed of 75 km/h, the internal pressure of the tire being set to 2.5 bar. This test is stopped when a deformation of the crown reinforcement of the tire is detected.

Each tire had first been "baked" (unmounted) for 4 weeks at 65° C.

The results obtained are expressed in the form of a mileage performance (base 100 for the "control" tire).

EXAMPLE 1

1) First resin R1 according to the invention (comprising close to 100% units resulting from the polymerization of α-pinene):

The resin R1, sold by HERCULES under the name "R2495", has:
an aliphatic linkage content of 97%,
an aromatic linkage content of 0%,
number-average Mn and weight-average Mw molecular weights respectively of 820 g/mol and 1060 g/mol, and
a glass transition temperature Tg of 88° C.

2) Synthesis of a second resin R1' according to the invention (homopolymer of limonene):

0.42 g of $AlCl_3$, which is placed in a "Steinie" bottle under nitrogen, was weighed into a glove box (in an inert atmosphere). 50 ml of anhydrous toluene, then 50 ml of pure d-limonene (dextrorotatory enantiomer) is then introduced into this bottle, then the bottle is stirred in a bath thermostatically controlled to 25° C. for 4 hours. The reaction is stopped with 3 ml of acetylacetone, and the resin is recovered by coagulation in methanol after addition of 0.4 phr of phenolic antioxidant "Etyl702".

After drying in an oven, a yellow, pale, translucent resin R1' is obtained with an average yield of 67%, number-average Mn and weight-average Mw molecular weights respectively of 585 g/mol and 866 g/mol and a glass transition temperature Tg of 68° C.

This resin R1' has an aliphatic linkage content of 100% and an aromatic linkage content of 0%, and it is formed exclusively of limonene units.

3) Tread compositions according to the invention I1, I1' comprising respectively these resins R1, R1' in comparison with a "control" composition T1 without resin:

Each of these compositions T1, I1, I1' is intended to constitute a tread of a tire of "passenger vehicle" type. Table 1 below contains:
the formulation of each of these compositions T1, I1, I1';
the properties of each composition T1, I1 and I1' in the non-cross-linked and cross-linked state and the performance of the corresponding tires of dimension 175/70 R14 "MXT".

TABLE 1

|  | Composition T1 | Composition I1 | Composition I1' |
|---|---|---|---|
| FORMULATION | | | |
| Elastomeric matrix | S-SBR A (57.5 phr) | S-SBR A (45 phr) | S-SBR A (45 phr) |
|  | BR A (42.5 phr) | BR A (55 phr) | BR A (55 phr) |
|  | Silica Zeosil 1165 MP | Silica Zeosil 1165 MP | Silica Zeosil 1165 MP |
| Reinforcing filler 1 | 80 phr | 80 phr | 80 phr |
|  | Black N234 | Black N234 | Black N234 |
| Reinforcing filler 2 | 10 phr | 10 phr | 10 phr |
| Bonding agent ("Si69") | 6.4 phr | 6.4 phr | 6.4 phr |
| Total aromatic oil | 39.5 phr | 22.5 phr | 21 phr |
| Plasticizing resin R1 (α-pinene) |  | 17 phr |  |
| Plasticizing resin R1'(poly-limonene) |  |  | 18.5 phr |
| Stearic acid/ZnO | 2/2.5 phr | 2/2.5 phr | 2/2.5 phr |
| Antioxidant ("6PPD") | 2 phr | 2 phr | 2 phr |
| DPG/sulphur/accelerator("CBS") | 1.5/1.0/2.0 phr | 1.5/1.0/2.0 phr | 1.5/1.0/2.0 phr |

TABLE 1-continued

|  | Composition T1 | Composition I1 | Composition I1' |
|---|---|---|---|
| PROPERTIES | | | |
| ML(1 + 4) at 100° C. | 102 | 97 | 103 |
| Shore A | 63 | 62 | 62 |
| ME100 at 23° C. | 1.55 | 1.45 | 1.50 |
| Scott break index 23° C. | 640 | 700 | 690 |
| (Deformation in %/Stress in MPa) | 22.3 | 22.1 | 22.1 |
| HL at 60° C. | 29.0 | 31.0 | 31.0 |
| Dynamic properties at 10 Hz, at 0.7 MPa and 0.2 MPa stress | | | |
| Tg (MDC at 0.2 MPa) in ° C. | −31.5 | −32.0 | −30.8 |
| Tg (MDC at 0.7 MPa) in ° C. | −20.8 | −21.1 | −21.1 |
| Max Tan delta (0.7 MPa) | 0.77 | 0.75 | 0.75 |
| Dynamic properties at 10 Hz, deformation properties at 23° C. | | | |
| DELTA G*(G* − G*50%) | 5.2 | 4.8 | 4.6 |
| Tan delta max (at approximately 7% deformation) | 0.34 | 0.35 | 0.35 |
| PERFORMANCES OF THE TIRES (175/70 R14 "MXT") | | | |
| Wear resistance (at 8° C. on wet ground at 37%, for a Citroën XSARA 1.8i 1) | 100 | 111 | 112 |
| Grip (at 15° C. for a Renault Laguna 2 1) | | | |
| braking dry ground ABS | 100 | 100 | 100 |
| braking wet ground ABS | 100 | 100 | 100 |
| Behavior on wet ground (at 15° C., for a Golf 75) | 100 | 100 | 100 |
| Rolling resistance (9.23 kg/ton) | 100 | 99 | 99 |
| RESISTANCE OF 195/65 R14 "MXT" TIRES/CROWN PLY SEPARATION | | | |
| Mileage performance | 100 | 129 | 129 |

With S-SBR A: copolymer of styrene and butadiene prepared in solution having a 1,2-linkage content of 58%, a styrene linkage content of 25%, a Mooney viscosity ML(1+4) at 100° C. of 54, a quantity of oil equal to 37.5 phr and a glass transition temperature Tg of −29° C.

With BR A: polybutadiene having a very high cis-1,4 linkage content of approximately 93%, a glass transition temperature Tg of −103° C. and a Mooney viscosity ML(1+4) at 100° C. equal to 54.

With 6PPD: N-(1,3-dimethylbutyl)-N-phenyl-p-phenylenediamine, and CBS: N-cyclohexyl-benzothiazyl sulphenamide.

It will be noted that the respective Tg of compositions I1 and I1' according to the invention, under a dynamic stress of high modulus (0.7 MPa), are provided to be substantially equal to the corresponding Tg of the "control" composition T1.

As can be seen in Table 1, the variance between the Tg of the compositions T1, I1 and I1' which were measured at a dynamic stress of reduced modulus, equal to 0.2 MPa, is very close to the variance between the Tg of said compositions T1, I1 and I1' which were measured under said stress of high modulus.

This absence of difference between the Tg when passing from a stress of high modulus to a stress of low modulus expresses the fact that the resin R1 and the resin R1' are each readily miscible in the elastomeric matrix constituted by the S-SBR A and the BR A.

This table 1 also shows that the incorporation of these resins R1 or R1' according to the invention (of an Mn of between 500 and 1000 g/mol and of a Tg of between 60° C. and 100° C.) in the respective compositions I1 and I1' imparts to the tires having treads which are formed of these compositions a wear resistance which is very greatly improved compared with that of the "control" composition T1 which is devoid of resin, while practically retaining the grip and rolling resistance performances of the tires incorporating said composition T1 and maintaining or improving the mechanical properties (ME100 and Scott break index) of said composition T1.

These resins R1 or R1' according to the invention also impart improved endurance to the corresponding tires, insofar as they improve their resistance to separation of the triangulation crown plies which-each of these tires comprises in its crown reinforcement.

It will also be noted that compositions I1 and I1' comprise far less aromatic oil than composition T1, which contributes to the protection of the environment by significantly reducing the pollution resulting from the exudation of this oil by the tires, this exudation furthermore being minimized due to the increased wear resistance of the tires of the invention.

EXAMPLE 2

1) Third resin R2 according to the invention (comprising close to 100% units resulting from the polymerization of limonene):

The resin R2, sold by DRT under the name "Dercolyte L120", has:
an aliphatic linkage content of 100%,
an aromatic linkage content of 0%,
number-average Mn and weight-average Mw molecular weights respectively of 625 g/mol and 1010 g/mol, and
a glass transition temperature Tg of 72° C.

2) Fourth resin R2' according to the invention (comprising close to 100% units resulting from the polymerization of dipentene):

The resin R3, a resin sold by ARIZONA under the name "Sylvagum TR7125C", has:

an aliphatic linkage content of 100%,
an aromatic linkage content of 0%,
number-average Mn and weight-average Mw molecular weights respectively of 630 g/mol and 950 g/mol, and
a glass transition temperature Tg of 70° C.

3) Tread compositions according to the invention I2, I2' comprising respectively these resins R2, R2' in comparison with a "control" composition T2 without resin:

Each of these compositions T2, I2, I2' is intended to constitute a tread of a tire of "passenger-vehicle" type. Table 2 below contains:

the formulation of each of these compositions T2, I2, I2';

the properties of each composition T2, I2 I2' in the non-cross-linked and cross-linked state and the performance of the corresponding tires of dimension 175/70 R14 "MXT".

TABLE 2

|  | Composition T2 | Composition I2 | Composition I2' |
|---|---|---|---|
| FORMULATION | | | |
| Elastomeric matrix | S-SBR A (85 phr) BR A (15 phr) | S-SBR A (70 phr) BR A (30 phr) | S-SBR A (70 phr) BR A (30 phr) |
| Reinforcing filler 1 | Silica Zeosil 1165 MP 85 phr | Silica Zeosil 1165 MP 85 phr | Silica Zeosil 1165 MP 85 phr |
| Reinforcing filler 2 | Black N234 5 phr | Black N234 5 phr | Black N234 5 phr |
| Bonding agent ("Si69") | 6.8 phr | 6.8 phr | 6.8 phr |
| Total aromatic oil | 32.5 phr | 12.5 phr | 1.25 phr |
| Plasticizing resin R2 | | 20 phr | |
| Plasticizing resin R2' | | | 20 phr |
| Stearic acid/ZnO | 2/2.5 phr | 2/2.5 phr | 2/2.5 phr |
| Antioxidant ("6PPD") | 2 phr | 2 phr | 2 phr |
| DPG/sulphur/accelerator("CBS") | 1.5/1.0/2.0 phr | 1.5/1.0/2.0 phr | 1.5/1.0/2.0 phr |
| PROPERTIES | | | |
| ML(1 + 4) at 100° C. | 97 | 110 | 113 |
| Shore A | 69 | 68 | 69 |
| ME100 at 23° C. | 1.95 | 1.90 | 2.0 |
| Scott break index 23° C. (Deformation in %/Stress in MPa) | 530 21.1 | 540 22.7 | 570 23.9 |
| HL at 60° C. | 29.5 | 31.0 | 32.0 |
| Dynamic properties at 10 Hz, at 0.7 MPa and 0.2 MPa stress | | | |
| Tg (MDC at 0.2 MPa) in ° C. | −17.9 | −18.3 | −17.8 |
| Tg (MDC at 0.7 MPa) in ° C. | −9.1 | −8.7 | −9.1 |
| Max Tan delta (0.7 MPa) | 0.90 | 0.88 | 0.85 |
| Dynamic properties at 10 Hz, deformation properties at 23° C. | | | |
| DELTA G*(G* − G*50%) | 5.6 | 5.4 | 6.0 |
| Tan delta max (at approximately 7% deformation) | 0.38 | 0.39 | 0.40 |
| PERFORMANCES OF THE TIRES (175/70 R14 "MXT") | | | |
| Wear resistance (at 10° C. on wet ground at 24%, for a Citroën Xantia 1.8 l) | 100 | 112 | 110 |
| Grip (at 18° C. for a Renault Laguna 2 l) | | | |
| braking dry ground ABS | 100 | 102 | 102 |
| braking wet ground ABS | 100 | 99 | 99 |
| Behavior on wet ground (at 15° C., for a CLIO 1.6 l) | 100 | 100 | 100 |
| Rolling resistance (10.2 kg/ton) | 100 | 99 | 98 |

It will be noted that the respective Tgs of compositions I2 and I2' according to the invention, under a dynamic stress of high modulus (0.7 MPa), are provided to be substantially equal to the corresponding Tg of the "control" composition T2.

As can be seen in Table 2, the variance between the Tg of the compositions T2, I2 and I2' which were measured at a dynamic stress of low modulus, equal to 0.2 MPa, is very close to the variance between the Tg of said compositions T2, I2 and I2' which were measured under said stress of high modulus.

This absence of difference between the Tg when passing from a stress of high modulus to a stress of low modulus expresses the fact that the resin R2 and the resin R2' are each readily miscible in the elastomeric matrix constituted by the S—SBR A and the BR A.

This table 2 also shows that the incorporation of the resins R2 or R2' according to the invention (of an Mn of between 500 and 1000 g/mol and of a Tg of between 60° C. and 100° C.) in the respective compositions I2 and I2' imparts to the tires having treads which are formed of these compositions a wear resistance which is very greatly improved compared with that of the "control" composition T2 devoid of resin, practically without adversely affecting the grip on dry ground and on wet ground, the behavior on wet ground and rolling resistance of the tires incorporating said composition T2, and maintaining or improving the mechanical properties (ME100 and Scoff break index) of said composition T2.

It will also be noted that compositions I2 and I2' comprise far less aromatic oil than composition T2 (composition I2' comprising only 1.25 phr of aromatic oil), which contributes to the protection of the environment by significantly reducing the pollution resulting from the exudation of this oil by the tires, this exudation furthermore being minimized due to the increased wear resistance of the tires of the invention.

What is claimed is:

1. A tire tread which comprises a cross-linkable or cross-linked rubber composition comprising a plasticizing resin of number-average molecular weight of from 400 to 2000 g/mol, wherein said resin is formed wholly from units resulting from the polymerization of a monocyclic unsaturated terpene in a mass fraction of from 70% to 100%, and said resin has a glass transition temperature greater than 50° C. and less than 120° C.

2. The tired tread according to claim 1, wherein said resin has a glass transition temperature of from 60° C. to 100° C.

3. The tire tread according to claim 1, wherein said resin has a number-average molecular weight of from 500 to 1000 g/mol.

4. The tire tread according to claim 1, wherein said resin has a polymolecularity index of less than 2.

5. The tire tread according to claim 1, wherein the monocyclic unsaturated terpene is limonene.

6. The tire tread according to claim 1, wherein said resin has a glass transition temperature of from 60° C. to 80° C.

7. The tire tread according to claim 1, based on at least one diene elastomer, said elastomer resulting from the polymerization of at least one conjugated diene monomer having a molar ratio of units resulting from conjugated dienes which is greater than 50%, wherein said resin is in a mass fraction of from 5 to 45 phr (phr: parts by weight per hundred parts of elastomer(s)).

8. The tire tread according to claim 7, wherein said resin is present in a quantity of from 15 to 30 phr.

9. The tire tread according to claim 1, which further comprises, in a quantity of from 0 phr to 30 phr, at least one plasticizing oil extracted from petroleum of a paraffinic, aromatic or naphthenic nature.

10. The tire tread according to claim 9, wherein the plasticizing oil(s) extracted from petroleum is present in a quantity of from 0 phr to 15 phr.

11. The tire tread according to claim 10, which is totally devoid of plasticizing oil extracted from petroleum.

12. The tire tread according to claim 1, said composition further comprising a reinforcing filler, wherein said reinforcing filler comprises a reinforcing inorganic filler in a mass fraction greater than 50%.

13. The tire tread according to claim 12, wherein said reinforcing filler comprises a blend of said reinforcing inorganic filler with carbon black.

14. The tire tread according to claim 1, which further comprises, in a quantity of from 10 phr to 40 phr, at least one plasticizing compound not extracted from petroleum of synthetic or natural origin, comprising at least one glycerol fatty acid triester, such that the whole constituted by said fatty acid comprises oleic acid in a mass fraction equal to or greater than 60%.

15. The tire tread according to claim 1, wherein said composition comprises:
in a quantity greater than 40 phr and up to 100 phr, at least one diene elastomer having a glass transition temperature of between −65° C. and −10° C., and
in a quantity less than 60 phr and down to 0 phr, at least one diene elastomer having a glass transition temperature of between −110° C. and −80° C.

16. The tire tread according to claim 15, wherein:
said diene elastomer(s) having a glass transition temperature of between −65° C. and −10° C. is selected from the group consisting of copolymers of styrene and butadiene prepared in solution, copolymers of styrene and butadiene prepared in solution, copolymers of styrene and butadiene prepared in emulsion, natural polyisoprenes, synthetic polyisoprenes having a cis-1,4 linkage content greater than 95%, copolymers of butadiene and isoprene, copolymers of styrene and isoprene, terpolymers of styrene, butadiene and isoprene and of a mixture of these elastomers, and
said diene elastomer(s) having a glass transition temperature of between −110° C. and −80° C. comprise polybutadienes having cis-1,4 linkage contents greater than 90%.

17. The tire tread according to claim 16, which comprises a blend of a polybutadiene having a cis-1,4 linkage content greater than 90% as the diene elastomer having a glass transition temperature of between −110° C. and −80° C., and a copolymer of styrene and butadiene prepared in solution, as the diene elastomer having a glass transition temperature of between −65° C. and −10° C.

18. A tire, which comprises the tread according to claim 1.

* * * * *